April 12, 1938. E. E. COOPER ET AL Re. 20,692

PHOTOCOMPOSING MACHINE

Original Filed April 3, 1934 3 Sheets-Sheet 1

INVENTORS,
Edward Eugene Cooper,
Albert Theodore Troedel.
BY Townsend & Loftus
ATTORNEYS.

April 12, 1938. E. E. COOPER ET AL Re. 20,692

PHOTOCOMPOSING MACHINE

Original Filed April 3, 1934 3 Sheets-Sheet 2

INVENTORS,
Edward Eugene Cooper,
Albert Theodore Thoedel.
BY Townsend & Loftus.
ATTORNEYS.

April 12, 1938. E. E. COOPER ET AL Re. 20,692
PHOTOCOMPOSING MACHINE
Original Filed April 3, 1934 3 Sheets-Sheet 3
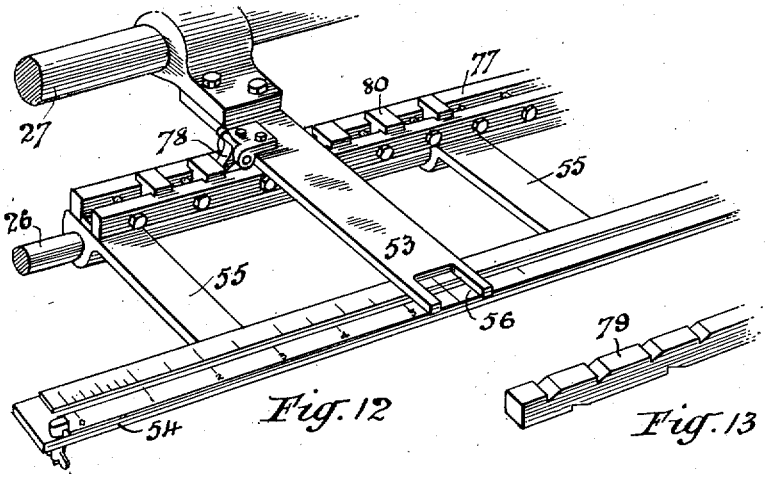
Fig. 12
Fig. 13
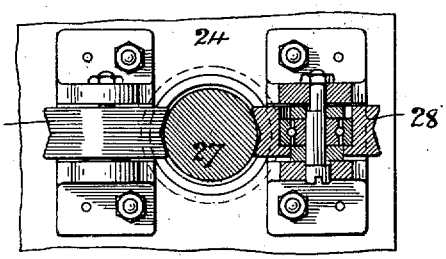
Fig. 14
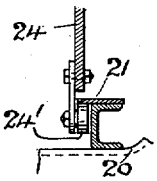
Fig. 15
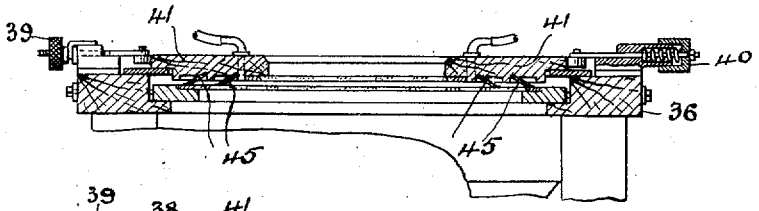
Fig. 16
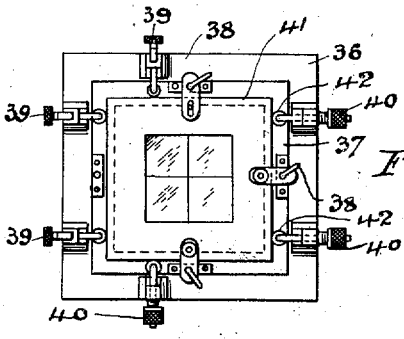
Fig. 17
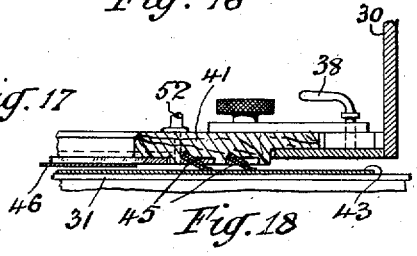
Fig. 18
INVENTORS.
Edward Eugene Cooper,
Albert Theodore Thordel
BY
Townsend & Lofass
ATTORNEYS.

Reissued Apr. 12, 1938

Re. 20,692

UNITED STATES PATENT OFFICE 20,692

PHOTOCOMPOSING MACHINE

Edward Eugene Cooper and Albert Theodore Troedel, Port Melbourne, Victoria, Australia Original No. 1,999,831, dated April 30, 1935, Serial No. 718,772, April 3, 1934. Application for reissue March 31, 1937, Serial No. 134,190. In Australia April 7, 1933

15 Claims. (Cl. 95—76)

This invention relates to photocomposing machines wherein sensitized plates receive photographic images, step by step, for use afterwards in printing. It has for its object to supply a machine the parts of which shall be capable of being accurately set and effectively operated in the production of such plates to be afterwards used in color and other printing.

To this end, one of the objects of the invention provides for the accurate setting of the negative in a negative holder in order that the multiplication of prints from the negative upon a sensitized plate such as zinc shall be spaced and positioned properly upon the plate.

Another object is to ensure that the moving parts of the machine shall be adjusted and set in such a manner that the movements in a longitudinal direction of a group of parts shall be substantially at right angles to the movements of the same transversely in the machine.

Provision is also made for mounting a negative carrier or carriers on shafts and for supporting and very accurately setting and adjusting the shafts. To ensure intimate contact between the negative and the sensitized plate prior to the image being printed thereon, we use a rubber gasket, preferably double between the negative and the plate in which a partial vacuum is created and broken after printing and before the negative is moved the next step over the plate.

The machine is such that the transverse movements of a negative carrier over a table carrying a sensitized plate are effected through a carriage moving over transverse rails while the placing longitudinally of the negative occurs through the movements of the carrier support in the carriage. In this way, photoprints are made on the plate, either transversely or longitudinally, step by step, in either direction with great exactness, after which the plate is developed in the ordinary way for use in a printing machine.

For the accurate movement of the parts step by step, longitudinal and transverse scale bars are provided on the machine rails with means for closely reading the calibrations prior to anchoring the adjusted parts in predetermined positions. Alternatively, instead of the longitudinal scale bar, a bar notched to scale and a riding pawl can be used, the notched bar being special to the spacing of a particular job or jobs and kept for the repetition of a job. If desired, a transverse scale bar having the same character may be employed.

Means are also provided for driving the parts longitudinally or transversely over the machine bed and for minutely setting and adjusting the same with the scale bars after being so moved and for anchoring the same when so adjusted.

But in order to fully understand the invention, reference is made to the accompanying drawings, in which Fig. 1 is a front elevation of the photocomposing machine, and Fig. 2 is a plan of same.

Fig. 12 shows in perspective view the longitudinal scale bar, the setting plate and the notch bar holder.

Fig. 13 is also a perspective view of the special job notch bar, carrying two sets of notches.

Fig. 14 is a sectional end elevation of a carrier shaft and its adjustable supports.

Fig. 15 shows in front sectional elevation a supporting plate of the carrier shafts and the steadying means thereon in contact with the machine carrying rails.

Fig. 16 illustrates in sectional elevation a register table with negative frame in place and under adjustment.

Fig. 17 is a plan view of the register table and negative frame in position therein, under adjustment, and Fig. 18 is a fragmentary view, enlarged, of the table, negative holder containing the negative frame, the sensitized plate under the negative and double gasket in place.

Figure 1:
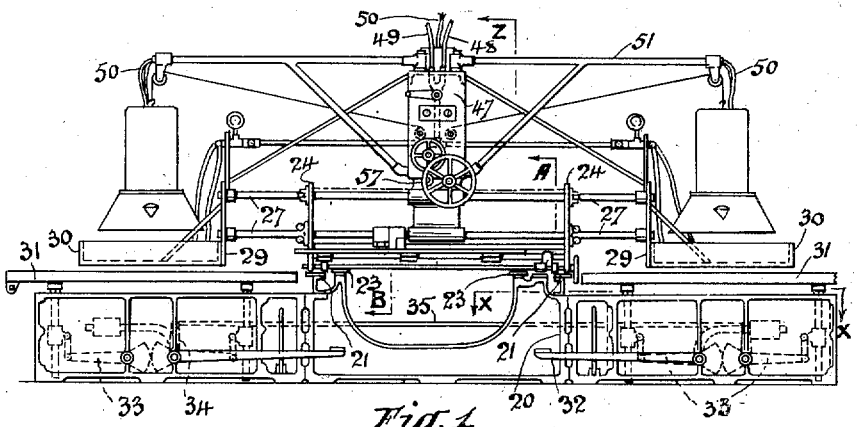
Figure 3:
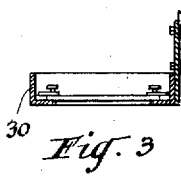
Fig. 3 shows a negative carrier in sectional elevation.
Figure 2:
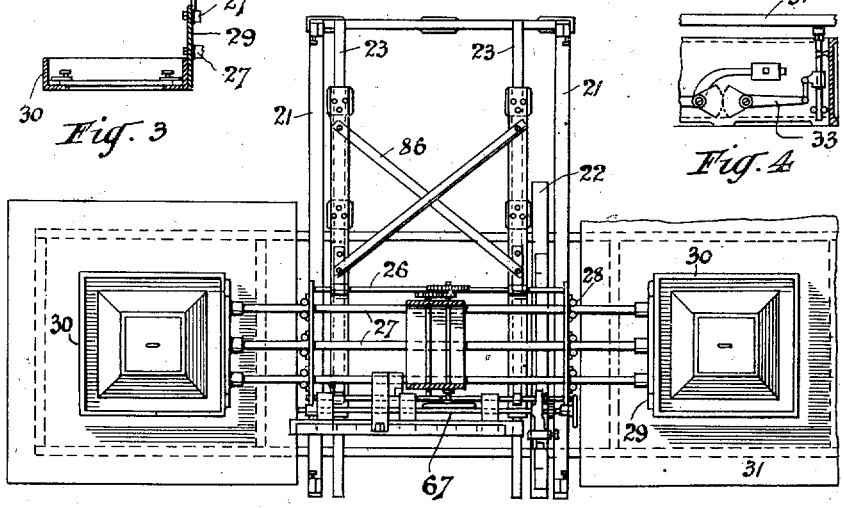
Figure 4:
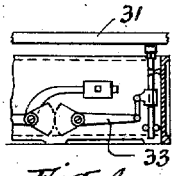
Fig. 4 is a detail in side elevation of a table lifting means, there being, if desired, a table and means at each side the machine for printing on two or four plates simultaneously.
Figure 6:
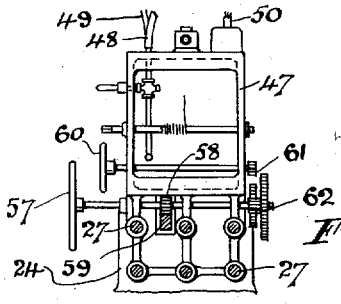
Fig. 6 shows in end sectional elevation the control tower, the finger being taken from the line Z of Fig. 1.
Figure 5:
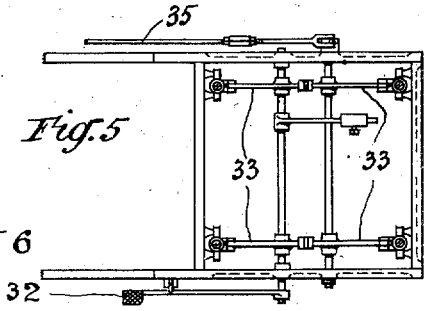
Fig. 5 is a plan, on the line X of Fig. 1, of the table raising and lowering means that may be interacting between a table at one side and the table at the other side of the machine.

The frame-work or base 20 of the machine is fixed and supports the transverse rails 21 upon which the superstructure and carriage are erected and move. Also on the frame-work is a rail 22 bearing the transverse scale bar, and the aligning bars 23. The vertical plates 24 are secured to the stay or brace rods 26 of which there are several and constitute the carriage of the machine that is supported on rollers 25 one of which is at the front and rear edges of the plates 24. To steady the machine during extended movements, rollers 24', Fig. 15, are attached to the plates 24 in such a way as to be suspended therefrom and to come under and in contact with the rails 21 on which the carriage moves. The rollers 24' will remain in contact with the rail to avoid any tipping of the superstructure during extended longitudinal movements thereof. The carrying wheels 25 are driven from the spur pinions 68 at one end of the structure. The carrier shafts 27 pass through the plates 24 but are not journalled therein. The plates carry on their outer faces brackets in which are rollers 28 that bear upon and support the shafts. The rollers are eccentrically mounted, see Fig. 14, on their bolts, by turning which the positions of the shafts can be individually altered and the whole set arranged in parallel while being free to move through the plates 24 and the rollers.

The carriage plates 24 only indirectly support the shafts, the holes therein through which the shafts pass being bored to a master plate or jig, each opening being such as to carry a bush with clearance between the shafts. A convenient way for proving the shafts 27 parallel is to arrange for same to pass centrally through the holes in the plates, with slight clearance, the positions then being checked by feeler gauges inserted between the shafts and the bushes.

At their ends the shafts support the plates 29 each of which is attached to and maintains a negative carrier 30 suspended over a table 31. The table or tables when actuated should move in a vertical plane and to ensure such movements the downwardly depending legs of each table pass between rollers similar to rollers 28 held on the framework 20. The legs are secured at right angles to the tables which are raised and lowered through the legs by any convenient means such as the foot pedals 32 and levers 33 which can be interacting through levers 34 and the connecting rod 35, Fig. 1. The rod may be uncoupled and each table moved, if required, independently.

In machines of the kind indicated, it is of great importance to set and mount the negative correctly in its support, that is to say, at dead centre with the keys or dowels. To this end, the negative before being placed in the negative carrier 30 is put in the register frame 36 which contains the case member 37 to which the negative in its mount can be secured, when set to register, by the keys 38, in the usual manner. But in order to set the negative quickly and accurately to the artist's marks, the usual screws 39 are upon the register frame 36 together with the screws 40. All are provided with rollers on the tips in contact with the negative frame 41 and the screws 40 are provided with spring buffers against which will be borne the pressure of the screws 39 by which the negative holder can be moved in a gyratory way to bring the negative to register dead centre, the negative holder and frame or mounting 41 meanwhile moving easily on the rollers 42 of the screws 40. When the negative 46 is properly set it is locked in the chase and taken out and placed on a similar set chase in the negative carrier 30 and therein held over the sensitized plate 43 that rests on the table 31. Between the negative and the plate 43 is a rubber double gasket 45 that serves to keep the plate and negative in their relative positions while the photo print is being made. We therefore attach into the gasket, pipes through which a vacuum pump may operate to provide a partial vacuum in the gasket and at the proper time admit air thereto to break the vacuum to permit the gasket to freely leave the plate. The leads or tubes come in through the control tower 47 that is mounted on the shafts 27. The lead to vacuum pump is marked 48 and lead 49 is to atmosphere or an air compressor. The lead 50 is to the electric lamps upon each end of the movable arms 51, supported on the tower 47. Also on the tower are the necessary switches and controls of the working parts and of the gasket 45, to which air or vacuum is provided through pipe 52, Fig. 18. The lights are switched on while the lamps hang over the negative to print the image on the sensitized plate. After printing, the table is lowered away and the carrier 30 is moved further over the table into position to print the next picture. To keep the images in proper alignment, it is consequently necessary to so adjust the parts of the machine that same will move longitudinally in a direction that shall be exactly at right angles with the line of movement transversely.

Figure 7:
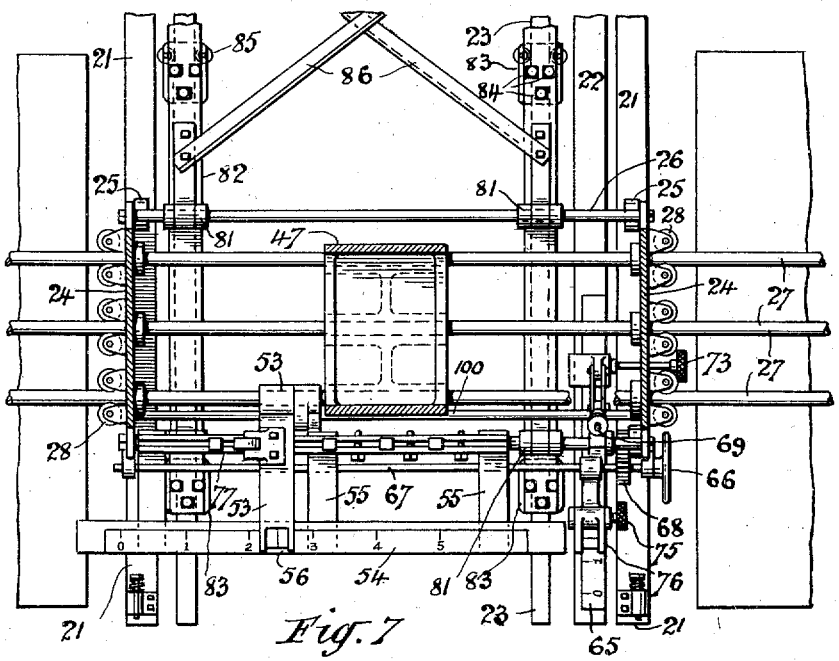
Fig. 7 represents the main working parts of the machine, in plan view, enlarged from Fig. 2.
Figure 10:
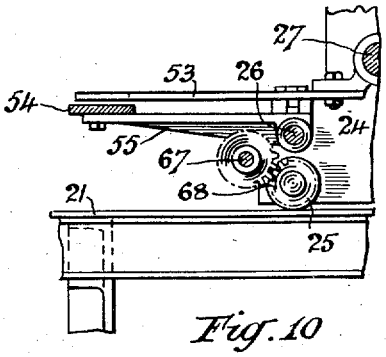
Fig. 10 is a sectional end elevation, at line B of Fig. 1, of means for moving the carriage transversely in the machine.
Figure 9:
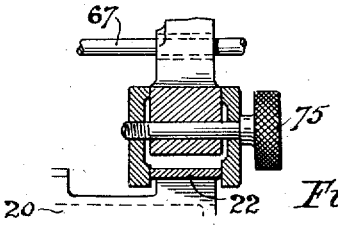
Fig. 9 shows in sectional detail means for locking a transverse movement, taken at line C, Fig. 8.
Figure 11:
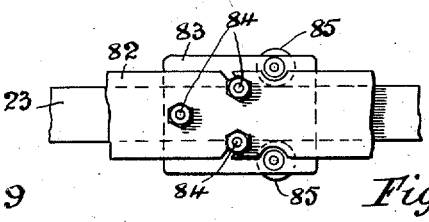
Fig. 11 is a plan of the same for correcting the position of the parts laterally.

On a carrier shaft 27 a bar 53, called the setting bar, Figs. 7, 10, and 12, is mounted and moves with the shafts over a fixed scale bar 54 bearing the required calibrations and that is supported on brackets 55 on a stay rod 26. In the forward end the setting bar is fitted with a window 56, Fig. 12, that is brightly illuminated and lined to assist the operator in reading the calibrations on the rail 54.

Figure 8:
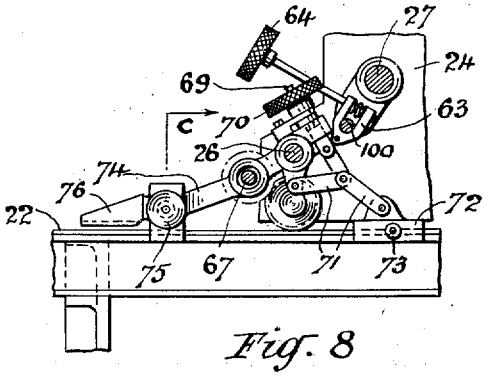
Fig. 8 is a sectional elevation on line A, of Fig. 1, of the transverse adjustment means and showing devices for locking a longitudinal movement.

To cause the shafts and control tower to be moved longitudinally in the machine, a hand wheel 57 is on the tower 47, that operates a rack and pinion through suitable gearing. To slow down the movement when setting the position of the parts through the window 56, the back gear is employed through the hand wheel 60 on the spindle of which is a pinion 61, that engages with the spur wheel 62, on the spindle of which is the pinion 58 in mesh with the teeth of a rack 59 supported between the carriage plates 24. The final setting movement will be effected through the wheel 60 and the parts can then be locked or anchored through the clamping jaw 63, Fig. 8, and thumb screw 64 carried by a shaft 27 and adapted to grip upon a fixed rod 100.

To move, adjust and secure the parts transversely, a scale bar 65 is upon the transverse rail 22 over which the carriage is moved through hand wheel 66 on spindle 67 and gearing 68 associated with the carrying wheels 25. When the movement through the hand wheel 66 is nearly complete it is finished through the device illustrated in Fig. 8. This comprises a bracket mounted on a forward stay rod 26 bearing a thumb nut 70 on the spindle 69, which is screw threaded, and connected at its forward end to links 71 arranged togglewise. The lower pair of links are at an obtuse angle and to the end of the rearward link a sliding shoe 72 upon the rail 22 is connected. On the shoe is a pressure screw 73 by which the shoe can be secured to the rail. The forward arm 74 extends over the driving rod 67 into another shoe adapted to grip the rail 22 through the thumb screw 75 and terminates in the lined window 76 over the scale bar 65, Figs. 7 and 8. Now, after the superstructure has been moved the approximate distance by the hand wheel 66, same can with accuracy be adjusted and positioned by operating the nut 70, after the shoe 72 has been secured to 22, to alter the position of the lower pair of links 71. If the screw be turned to cause the links to come more into line the member 76 will be moved forward over the scale 65, and reversely if the angle between the links 71 is reduced, thus setting the line in the window 76 into accurate coincidence with the line on the scale. After so setting, the screw 75 is used to secure the parts to the rail 22 after, if desired, easing the shoe 72.

Instead of the longitudinal scale bar 54, the notched bar holder 77 can be on a front stay rod 26 and employed with a pawl 78 on the setting bar 53. In the holder the notch bar 79 will be held in place and relied upon instead of the stops 80 that are engaged by the pawl 78 as the bar 53 moves. The notches in the bar 79 will be positioned to suit a particular job and after use will be identified with that job for use again on repeat orders. There may be two sets of notches in the bar, as shown, each applying to a particular job. As the setting bar moves with its pawl longitudinally with a carrier shaft 27, the pawl will drop into a notch in the bar 79, the distance between centres in the notches being the distance between centres of the images or prints to be made on the sensitized plate. A table is at each end of the machine, each table carrying a sensitized plate. Two plates can be on each table over each of which will be suspended a double negative carrier 30.

In the application of the negative to the sensitized printing plate and for developing the same, the image to be placed on the plate is in the form of a negative made photographically or through dia-positives from original stones or plates. The negatives are set in a frame or register to accord with the artist's or register marks and are placed in the negative carrier, one going into each end of the machine. The printing plates are coated with a photographic solution which becomes sensitive to light when dry. Working in an orange light, the plates are attached to the tables and the negatives are stepped accurately over the plates, the position of each step, prior to exposure to the arc lamps, being accurately located by the adjustment means provided in the machine. After the plate has received the required number of exposures, it is rolled up all over with a black developing ink and placed under water and developed. This ink is soluble in water except where it comes in contact with light which causes the colloid in the photographic solution to harden, rendering it insoluble. As the plate develops under the action of the water those parts which have not been exposed to light and are still soluble develop away, carrying off the ink film. Those parts of the plate that have been exposed to light such as the open parts of the negative, remain firm, retaining part of the ink. While describing the process of development, we have no intention of claiming for same but only for the machine by which the photo record upon the negative or negatives can be accurately and expeditiously printed, step by step, upon a sensitized printing plate or plates.

As the parts are primarily set, as hereinbefore explained, for longitudinal movement in the machine, so provision must be made for primarily setting or fixing the parts for the transverse movements. This is looked after through the rails 23, which are securely held and supported on the bed frame 20. The carriage is supported on the rollers 25 moving on the rails 21 and in the structure are the front and rear stay rods 26. Hung on the said stay rods through the brackets 81 is a plate 82 over each rail 23 and bolted at each end at the points 84 to an adjustment plate 83. The two opposing bolts 84 are in oblique slots made in the plate 82 and the other bolt serves as a pivot for adjusting plate 82 in relation to rail 23. On the adjustment plate 83 behind the bolts 84 are rollers 85 which are mounted on eccentric spindles and the rollers bear against the edges of the rail 23. The plates 82 are braced across the machine by irons 86. If the bolts 84 are loosened the superstructure may be slightly slewed or turned to alter the direction of travel of same upon the rails 21 and the final minute adjustment is made to a standard line or to measurements by operating the eccentric rollers 85, after which the bolts 84 are again secured.

Having now described our invention, what we claim as new and desire to secure by Letters Patent is:—

1. In a photocomposing machine, a body, transverse rails thereon, a carriage and a vertical holed plate at each side movable over the rails, carrier shafts that pass through and are supported by the plates, negative carriers on the ends of said shaft, means for supporting a sensitized plate under each negative and means for moving the negative carriers with the shafts longitudinally or transversely step by step over the sensitized plates to print the photographed image thereon.

2. In a photocomposing machine, a carriage and vertical holed plates adapted to transverse movements therein, carrier shafts that pass through the plates, brackets on the vertical plates, rollers having eccentric spindles in the brackets said rollers bearing upon and supporting the shafts, negative carriers on the ends of the shafts and means for moving same longitudinally or transversely in the machine.

3. In a photocomposing machine, a carriage and vertical holed plates adapted to transverse movements therein, carrier shafts that pass through and are supported by the plates, negative carriers on the ends of said shafts, a scale bar on the machine and means for moving the carrier shafts and connections over the scale bar and for locking the parts when set.

4. In a photocomposing machine, a carriage and vertical holed plates adapted to transverse movements therein, carrier shafts that pass through and are supported by the plates, negative carriers on the ends of said shafts, a control tower on the shafts, a setting bar on a carrier shaft, a notched bar made to suit the spacing of a particular job held under the setting bar and a pawl thereon that, as the shafts and negative carriers move longitudinally, engages in the notches to control the step by step movements of the negatives.

5. In a photocomposing machine, a carriage and vertical holed plates adapted to transverse movements therein, shafts that move through and are supported by the plates, negative carriers on the ends of said shafts, means for supporting a sensitized plate under each negative and means whereby the parts can be adjusted and set in such a manner that the movements in a longitudinal direction of a group of parts shall be substantially at right angles with the movements of said parts transversely in the machine.

6. In a photocomposing machine, a body, transverse rails thereon, a carriage movable over the rails, vertical holed plates on the carriage, carrier shafts adapted to move through while being supported by the plates, negative carriers on the ends of the shafts, means for supporting a sensitized plate under each negative, a table adapted to be moved vertically carrying each plate, and means whereby the negatives are moved step by step over the plates transversely with the carriage and longitudinally through the movements in said carriage of the carrier shafts.

7. In a photocomposing machine, a body, transverse rails thereon, a carriage movable over the rails, vertical holed plates on the carriage, stay rods between the plates, carrier shafts adapted to move through the plates, negative carriers on the ends of the shafts, a calibrated rail parallel to the transverse rails, means for moving the carriage over the rails, a toggle device on a stay rod, clamping means at the rear end thereof, a clampable hood at the other end movable over the calibrations on the third rail when the toggle is operated to minutely adjust the position of the superstructure.

8. In a photocomposing machine, a carriage adapted to transverse movements therein, vertical holed plates on the carriage, stay rods between the plates, shafts that move through and are supported by the plates, negative carriers on the ends of said shafts, means for supporting a sensitized plate under each negative and a table bearing each sensitized plate adapted to be moved vertically towards or away from a negative.

9. In a photocomposing machine, a carriage adapted to transverse movements therein, vertical holed plates supported by stay rods on the carriage, shafts adapted to move through the plates, negative carriers on the ends of said shaft, means for supporting a sensitized plate under each negative, a table bearing each sensitized plate movable towards or away from a negative, a rubber gasket between a sensitized plate and a negative and means for creating a partial vacuum within the gasket and for releasing same from the sensitized plate.

10. In a photocomposing machine, a body, transverse rails thereon, a carriage movable over the rails, vertical holed plates on the carriage, a plurality of stay rods between the plates, a rail parallel to the carriage rails, carrier shafts adapted to move through the holed plates, negative carriers on the ends of the shafts, means on a stay rod for setting and locking the transversely movable parts on the parallel rail and means on a carrier shaft and another stay rod for locking the parts in longitudinal alignment.

11. In a photocomposing machine, a body, transverse rails thereon, a carriage movable over the rails, vertical holed plates on the carriage, a plurality of stay rods between the plates, carrier shafts adapted to move through the holed plates, negative carriers on the ends of the shafts, rails parallel to the carriage rails, brackets on the stay rods and plates attached to the brackets suspended over said parallel rails, an adjustment plate below and at each end of each suspended plate boltable thereto and rollers eccentrically mounted on the adjustment plates that bear on each side of a parallel rail whereby the direction of travel of the carriage may be altered.

12. In a photocomposing machine, a body, transverse rails thereon, a carriage movable over the rails, vertical holed plates on the carriage, shafts movable through the holed plates, negative carriers on the ends of the shafts, brackets depending from the holed plates over the carriage rails and a wheel in each bracket adapted to engage and move over the underside of a rail.

13. In a photocomposing machine, a carriage adapted to transverse movement therein, vertical holed plates on the carriage, shafts adapted to move through the plates, negative carriers on the ends of the shafts, means for supporting a sensitized plate on the table under each negative, a frame in which the negative is positioned to be made to register dead centre, a register table bearing the frame, roller tipped pressure screws on the table bearable upon the sides of the frame and buffer springs in the screws on two adjacent sides of the table.

14. In a photocomposing machine, a body, transverse rails thereon, a carriage and a vertical holed plate at each side movable over the rails, negative carriers, means passing through said plates providing the sole support for said negative carriers, means for supporting a sensitized plate under each negative and means for moving said negative carriers with their supporting means longitudinally or transversely step by step over the sensitized plate to print the photographed image thereon.

15. In a photocomposing machine, a body, transverse rails thereon, a carriage movable over the rails, vertical holed plates on the carriage, negative carriers, movable means extending through and supported by said plates for bearing said negative carriers, means for supporting a sensitized plate under each negative, a table adapted to be moved vertically carrying each plate, and means whereby the negatives are moved step by step over the plates transversely with the carriage and longitudinally through the movements in said carriage of the negative bearing means.

EDWARD EUGENE COOPER.
ALBERT THEODORE TROEDEL.